United States Patent
Locker et al.

(10) Patent No.: US 9,953,643 B2
(45) Date of Patent: Apr. 24, 2018

(54) SELECTIVE TRANSMISSION OF VOICE DATA

(75) Inventors: Howard Locker, Cary, NC (US); Daryl Cromer, Cary, NC (US); Scott Edwards Kelso, Cary, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 882 days.

(21) Appl. No.: 12/977,184

(22) Filed: Dec. 23, 2010

(65) Prior Publication Data

US 2012/0166184 A1   Jun. 28, 2012

(51) Int. Cl.
*G10L 15/22* (2006.01)

(52) U.S. Cl.
CPC .................... *G10L 15/22* (2013.01)

(58) Field of Classification Search
CPC ........................................ G06F 3/167
USPC ........................................... 704/201
See application file for complete search history.

(56) References Cited

U.S. PATENT DOCUMENTS

| | | | |
|---|---|---|---|
| 5,291,479 A * | 3/1994 | Vaziri et al. | 370/264 |
| 5,548,647 A * | 8/1996 | Naik et al. | 704/200 |
| 6,446,041 B1 * | 9/2002 | Reynar | G06F 3/167 704/235 |
| 6,813,603 B1 * | 11/2004 | Groner et al. | 704/235 |
| 7,899,500 B2 * | 3/2011 | Kreiner et al. | 455/569.1 |
| 8,223,189 B2 * | 7/2012 | Meyer | 348/14.01 |
| 2002/0126035 A1 * | 9/2002 | Hou | 341/176 |
| 2004/0128137 A1 * | 7/2004 | Bush et al. | 704/275 |
| 2004/0213402 A1 * | 10/2004 | Ruetschi | H04M 3/56 379/388.06 |
| 2005/0105559 A1 * | 5/2005 | Cain et al. | 370/498 |
| 2006/0195353 A1 | 8/2006 | Monne et al. | |
| 2006/0276211 A1 * | 12/2006 | Gallo | 455/507 |
| 2007/0014420 A1 * | 1/2007 | Brown | 381/110 |
| 2008/0021886 A1 * | 1/2008 | Wang-Aryattanwanich | G06F 9/4443 |
| 2011/0238414 A1 * | 9/2011 | Ju et al. | 704/201 |

FOREIGN PATENT DOCUMENTS

| | | |
|---|---|---|
| CN | 1351459 A1 | 5/2002 |
| CN | 1377550 A1 | 10/2002 |
| CN | 101834857 A1 | 9/2010 |
| DE | 60015531 T2 | 3/2005 |
| DE | 602005000628 T2 | 10/2007 |
| DE | 102009017177 A1 | 10/2009 |

(Continued)

*Primary Examiner* — Michael N Opsasnick
(74) *Attorney, Agent, or Firm* — Ference & Associates LLC

(57) ABSTRACT

Systems and methods that provide for voice command devices that receive sound but do not transfer the voice data beyond the system unless certain voice-filtering criteria have been met are described herein. In addition, embodiments provide devices that support voice command operation while external voice data transmission is in mute operation mode. As such, devices according to embodiments may process voice data locally responsive to the voice data matching voice-filtering criteria. Furthermore, systems and methods are described herein involving voice command devices that capture sound and analyze it in real-time on a word-by-word basis and decide whether to handle the voice data locally, transmit it externally, or both.

20 Claims, 4 Drawing Sheets

(56) References Cited

FOREIGN PATENT DOCUMENTS

| EP | 1617410 A1 | 1/2006 |
|----|-----------|--------|
| GB | 2368441 A | 1/2002 |
| WO | 0023985 A1 | 4/2000 |

\* cited by examiner

SELECTIVE TRANSMISSION OF VOICE DATA

BACKGROUND

Voice command technology enables operation of a device through user voice instructions. This technology has become increasingly popular and, as a result, the number and type of devices capable of voice control has steadily increased. This is especially true regarding cellular phones and certain automobile functions, such as operating a radio or navigation system, that users increasingly demand have a 'hands free' mode. Without the need to operate a device through buttons or switches, users may use voice command enabled devices while performing other tasks and with increased safety. The use of such devices, however, may give rise to certain conflicts when a user wants to mute the device or when multiple devices are within range of a user's voice. The ability of a device to selectively manage commands or voice data would greatly increase the functionality of voice command devices.

BRIEF SUMMARY

In summary, one aspect provides a system comprising: one or more processors; a system memory operatively coupled to the one or more processors; a sound receiver configured to receive voice data; and a voice data analyzer configured to determine whether the voice data corresponds with one or more local voice criteria; wherein responsive to the voice data corresponding to the one or more local voice criteria: the voice data is handled locally; and the voice data is not transmitted externally.

Another aspect provides a method comprising: receiving voice data at a sound receiver; and providing a voice data analyzer configured to determine whether the voice data corresponds with one or more local voice criteria; wherein responsive to the voice data corresponding to the one or more local voice criteria: the voice data is handled locally; and the voice data is not transmitted externally.

A further aspect provides a computer program product comprising: a computer readable storage device having computer readable program code embodied therewith, the computer readable program code comprising: computer readable program code configured to receive voice data at a sound receiver; and computer readable program code configured to provide a voice data analyzer configured to determine whether the voice data corresponds with one or more local voice criteria; computer readable program code configured to wherein responsive to the voice data corresponding to the one or more local voice criteria: the voice data is handled locally; and the voice data is not transmitted externally.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings.

DETAILED DESCRIPTION

Figure 1:
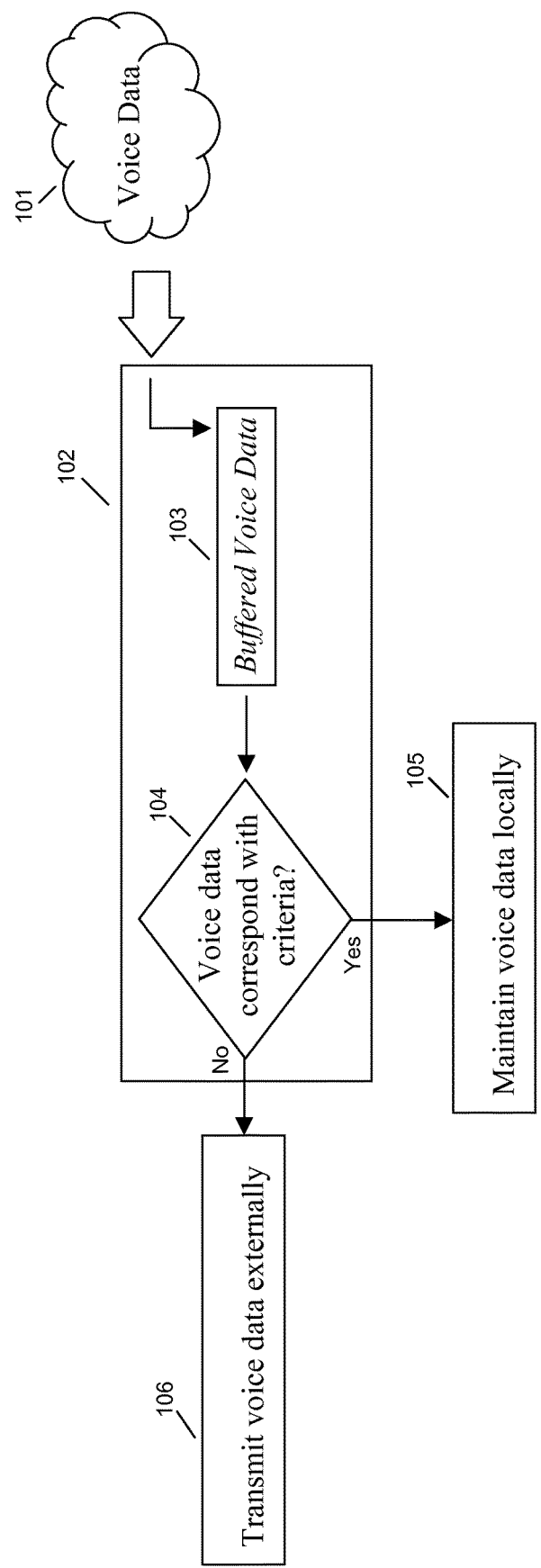
FIG. 1 provides a flow diagram of an embodiment.

It will be readily understood that the components of the embodiments, as generally described and illustrated in the figures herein, may be arranged and designed in a wide variety of different configurations in addition to the described embodiments. Thus, the following more detailed description of the example embodiments, as represented in the figures, is not intended to limit the scope of the claims, but is merely representative of those example embodiments.

Reference throughout this specification to "one embodiment" or "an embodiment" (or the like) means that a particular feature, structure, or characteristic described in connection with the example embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

The operation of devices through voice commands is becoming more popular, especially for smart phones that have either small or no keyboards and for automobiles that require hands free operation of certain functions. However, a conflict may arise when a user needs to mute a device microphone due to background noise, feedback on a multi-party call, or to keep a side conversation private from others on a conference call. In addition, many devices according to current technology provide that a user manually switch off mute in order to use voice commands. This limitation appears to defeat the convenience and safety resulting from using a device in a 'hands free' mode through voice commands. Furthermore, traditional muting may stop all voice operation of a device, while a user may want to maintain local operation but only mute the transmission of voice data. As such, a device that is able to treat voice data as locally active while outwardly muted would be highly desirable.

Embodiments provide for voice command devices that receive sound but do not transfer the voice data beyond the system unless certain voice-filtering criteria have been met. In addition, embodiments provide devices that support voice command operation while external voice data transmission is in mute operation mode. As such, devices according to embodiments may process voice data locally responsive to the voice data matching voice-filtering criteria. According to embodiments, voice command devices capture sound and analyze it in real-time on a word-by-word basis and decide whether to handle the voice data locally, transmit it externally, or both. Voice data received by a device may be buffered so that the device may analyze it according to embodiments. In addition, embodiments provide that any buffer delay may consist of a delay on the order of milliseconds. Thus, voice data transmission or voice activated commands may be executed essentially in real time or merely delayed within customary time periods experienced by similar devices.

Referring now to FIG. 1, therein is depicted an example embodiment. Voice data 101 is received by a voice data control system 102 and buffered 103. The voice data control system 102 analyzes the voice data 101 to determine whether the voice data 101 should be handled locally 105 or transmitted externally 106. If the voice data 101 corresponds with voice data criteria 104, the voice data is handled locally 105 at the device. On the other hand, if the voice data 101 does not correspond with the voice data criteria 104, the voice data 101 may be transmitted externally 106.

According to embodiments, voice-filtering criteria may include a list of predetermined or learned voice commands that are not transmitted and are only processed locally. A non-limiting example involves a cellular phone wherein a predetermined set of commands such as call, text, and volume commands activate certain functions and are only processed locally. Another non-limiting example is an automobile with a computer system for handling features such as navigation, climate control, sound systems, and telephone through voice commands wherein a predetermined list of voice commands are processed by the local computer system.

Figure 2:
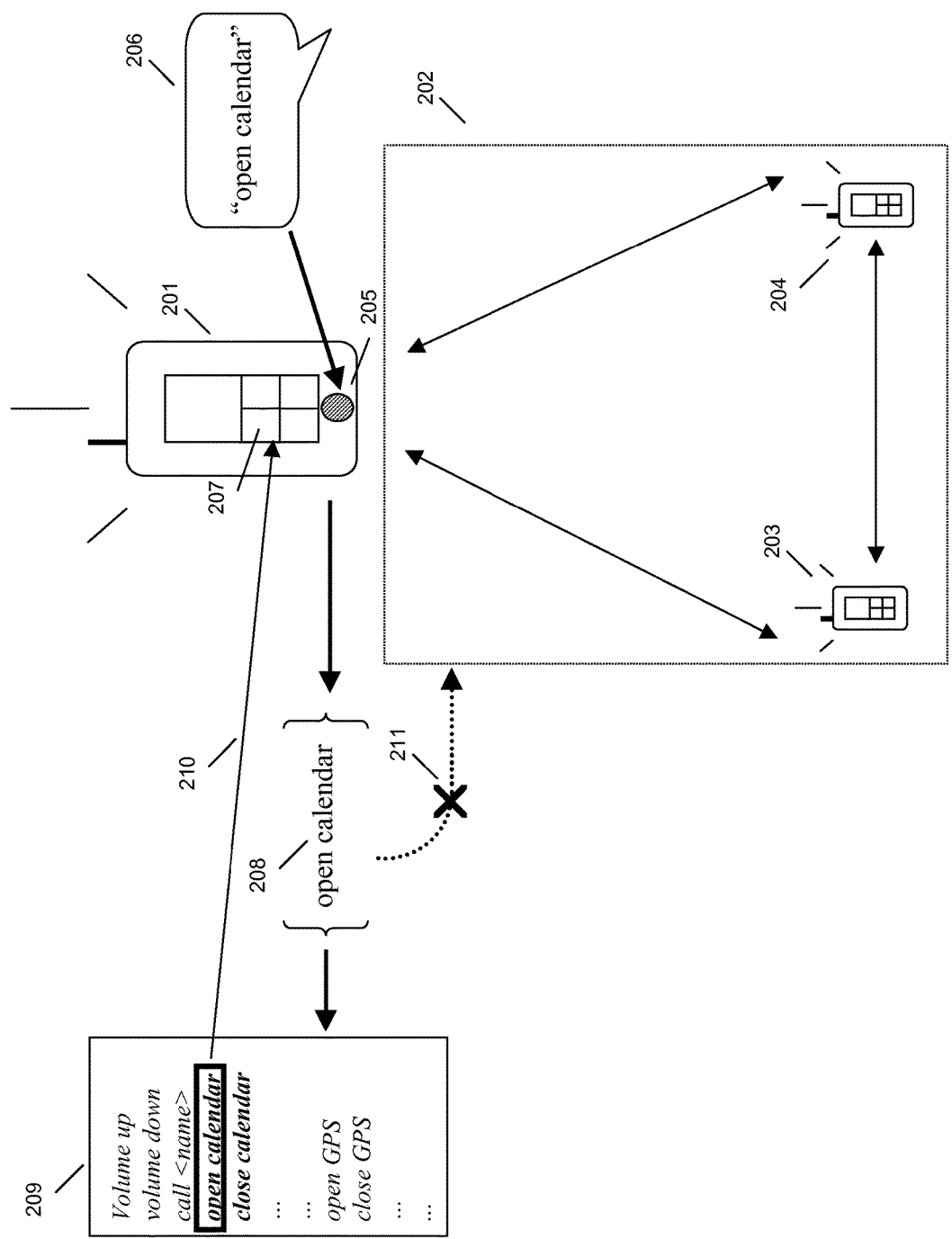
FIG. 2 illustrates an example embodiment of processing voice data based on a predetermined set of device commands.

Referring to FIG. 2, therein is depicted an example embodiment wherein whether voice data is transmitted externally is based on whether the voice data matches a predetermined set of device commands. The cellular phone 201 is being used in a 'hands free' mode wherein it is voice command activated. As depicted in FIG. 2, the cellular phone 201 is engaged in a conference call 202 wherein it is communicating with two other cellular phones 203, 204. The cellular phone microphone 205 receives voice data containing the spoken phrase "open calendar" 206. In the example depicted in FIG. 2, the user wants the cellular phone 201 to detect the "open calendar" phrase 206 and launch a calendar application 207 on the cellular phone, but does not want to interrupt the conference call by the other callers hearing the spoken phrase 206. The cellular phone 201 processes the voice command 208 and determines whether it is one of the terms in its predetermined local commands list 209. The "open calendar" voice command 206 is acted on locally 210 by the cellular phone to open the calendar application 207 because it is located in the predetermined local commands list 209. In addition, the voice command 206 is not transmitted externally 211 to the other callers 203, 204 engaged in the conference call.

Embodiments provide for a device that determines whether to only locally act on voice data based on the pitch of the speaker's voice. According to embodiments, pitch characteristics may include, but are not limited to, sound level, pauses in speech, how fast a speaker is speaking, accenting certain words, and changes in speech frequency. In addition, embodiments provide that a device may be trained to use pitch criteria. As such, embodiments provide for systems that train on user voice data such that the pitch of a user's voice may determine whether voice data should be limited to local processing or transmitted externally.

Figure 3:
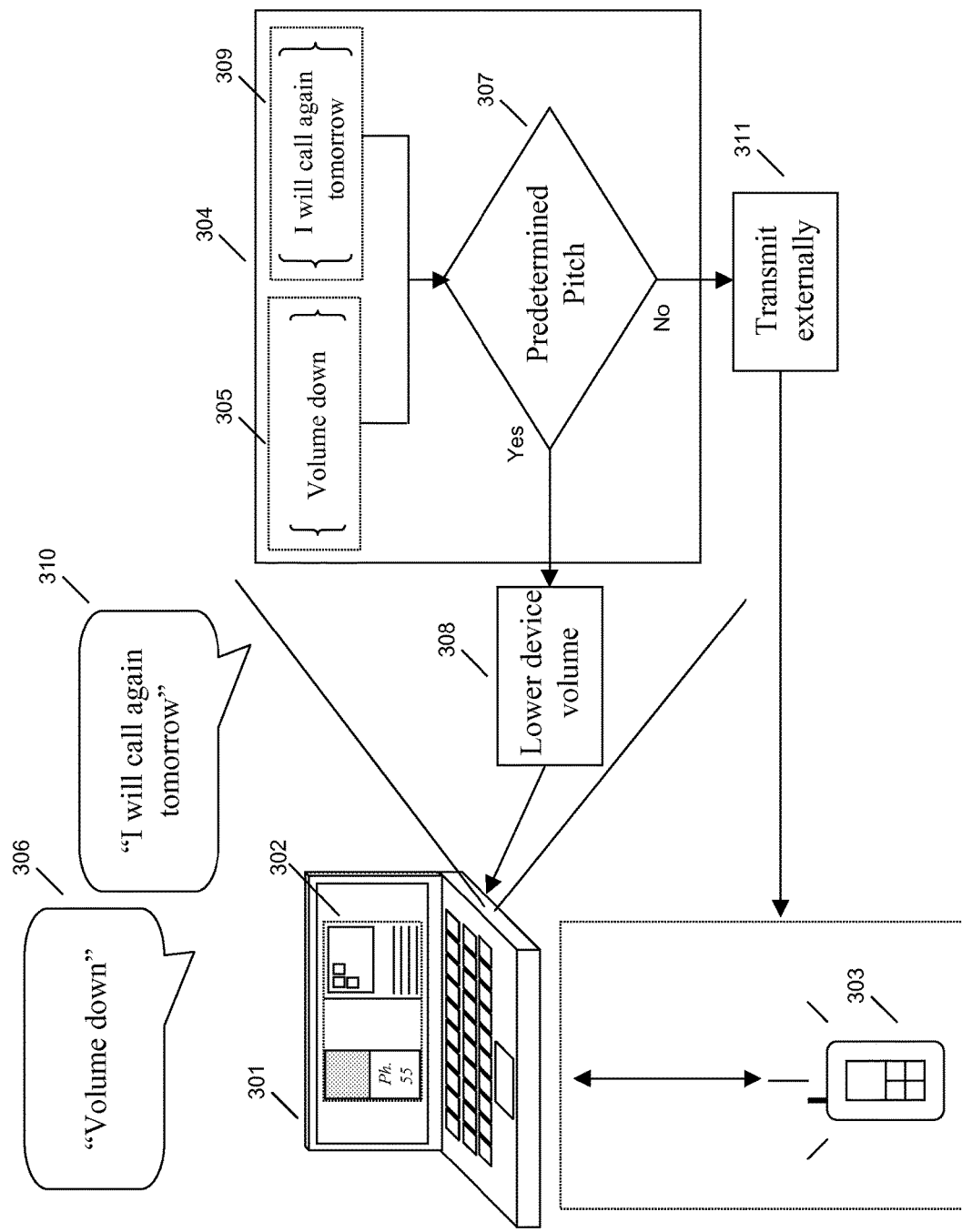
FIG. 3 illustrates an example embodiment of processing voice data based on the pitch of the voice data.

Referring to FIG. 3, therein is depicted an example embodiment wherein whether voice data is processed locally or transmitted externally is based on pitch. A laptop computer 301 is running a voice application 302 that is engaged in voice data transmission with a second computing device 303. As a non-limiting example, the voice application may be software that allows users to make phone calls between computing devices over the Internet. The laptop computer 301 voice data control system 304 receives user voice data 305 comprised of the spoken text "volume down" 306 and analyzes it to determine whether it contains words spoken by the user in a predetermined pitch 307. The voice data control system 304 determines that the words "volume down" 306 were spoken in a predetermined pitch 307. As such, the words "volume down" 306 are only processed locally by the laptop computer to lower the device volume 308 and are not transmitted externally 311 through the voice application 302. As depicted in FIG. 3, the voice data control system 304 analyzes further user voice data 309 comprised of the spoken words "I will call again tomorrow" 310. The voice data control system determines that the words "I will call again tomorrow" 310 were not spoken in a predetermined pitch 307. Rather, the words "I will call again tomorrow" 310 were spoken in a normal conversational tone and are transmitted externally 311 through the voice application 302.

Whether voice data is only processed locally at the device may be determined according to embodiments based on discrete words or pauses in a trained user's voice, including, but not limited to, detecting pauses in the speech that are contrary to normal conversational speech. As a non-limiting example, a GPS navigation device may have a "go to <location>" command for setting <location> as the user-specified location for the GPS navigation program. According to this non-limiting example, if the user states "{pause} . . . go to <location> . . . {pause}," a voice data control system according to embodiments may analyze the speech and categorize it as a non-conversational device voice command due to the pauses before and after the speech. As such, the voice command system will only handle the voice data locally and set the location of the GPS navigation program to <location>. On the other hand, if a user states that he would "like to go to <location> this week if I have the time," the device will discern that the phrase "go to <location>" was in normal conversation because it lacks distinguishing pauses. Thus, the device will not set the location of the GPS navigation program to <location> and will allow the voice data to be transmitted externally.

In addition, embodiments may determine whether voice data is local based on word-filtering criteria involving certain multi-word phrases or word pairings. As a non-limiting example, a GPS navigation device may not handle the word 'navigate' in isolation as a voice command that must not be transmitted externally. However, the GPS navigation device may respond to voice commands that involve multiple word pairings such as 'navigate on' or 'navigate off' as voice commands. As such, the voice commands will only be processed locally by the device and will not be transmitted externally.

According to embodiments, voice-filtering criteria may be based on user responses to a verification request initiated by the device. As a non-limiting example, a laptop computer may ask whether a certain word or phrase received by the device may be transmitted beyond the local device. Then, if the device receives voice data, such as the user speaking the word 'yes,' that indicates that the user wants the voice data to be transmitted, the device will transmit the voice data externally. Otherwise, the device only handles the voice data locally.

Embodiments provide that a device may determine whether to only maintain voice data locally based on whether the voice command mode has been enabled or disabled through a non-vocal method. Such non-vocal methods include, but are not limited to, button press, touchscreen gesture, face recognition, physical gesture with device, and physical gesture as detected by a camera. As a non-limiting example, a cellular phone with a keyboard may process voice commands locally when the keyboard is being used by the user and for a predetermined period of time (for example, five seconds) thereafter. In this example, voice commands may be transmitted beyond the device if the keyboard is deemed inactive, such as when the user is engaged in a call. According to another non-limiting example, a computing device with a camera that detects user gestures may determine whether to process voice commands locally or transmit them externally based on detection of certain user gestures or, alternatively, a lack thereof.

According to embodiments, voice command operation of a device is supported during mute operation. As such, certain embodiments provide for a 'sound firewall' wherein a device microphone remains active, however, no sound is transferred beyond the device unless certain criteria are met. Embodiments provide that a user may activate mute operation on a device, such that the user's voice is not transmitted externally, but voice commands remain active. As a non-limiting example, a smart phone user engaged in a conversation may place the smart phone in mute operation such that the other caller may not hear the user's voice. However, the smart phone may still receive the user's voice for processing voice activated commands even though it is in mute operation and is not transmitting the user's voice externally.

Devices according to embodiments may provide user feedback involving the status of voice input processing, including, but not limited to, whether voice input is being recognized, constrained to the local environment, being transmitted beyond the device, and whether a voice command has been initiated. As a non-limiting example, a device screen may display equalizer bars that indicate whether voice data is being received, and may provide a dynamic icon whose color and text are dependent upon whether voice data is limited to local processing or whether it is being transmitted externally.

Embodiments provide that whether voice data is only processed locally or transmitted externally may be determined based upon a combination of the voice-filtering criteria previously disclosed. As a non-limiting example, such a determination may be based on whether words contained within the voice data are in a pre-determined list and spoken with the appropriate pitch.

Figure 4:
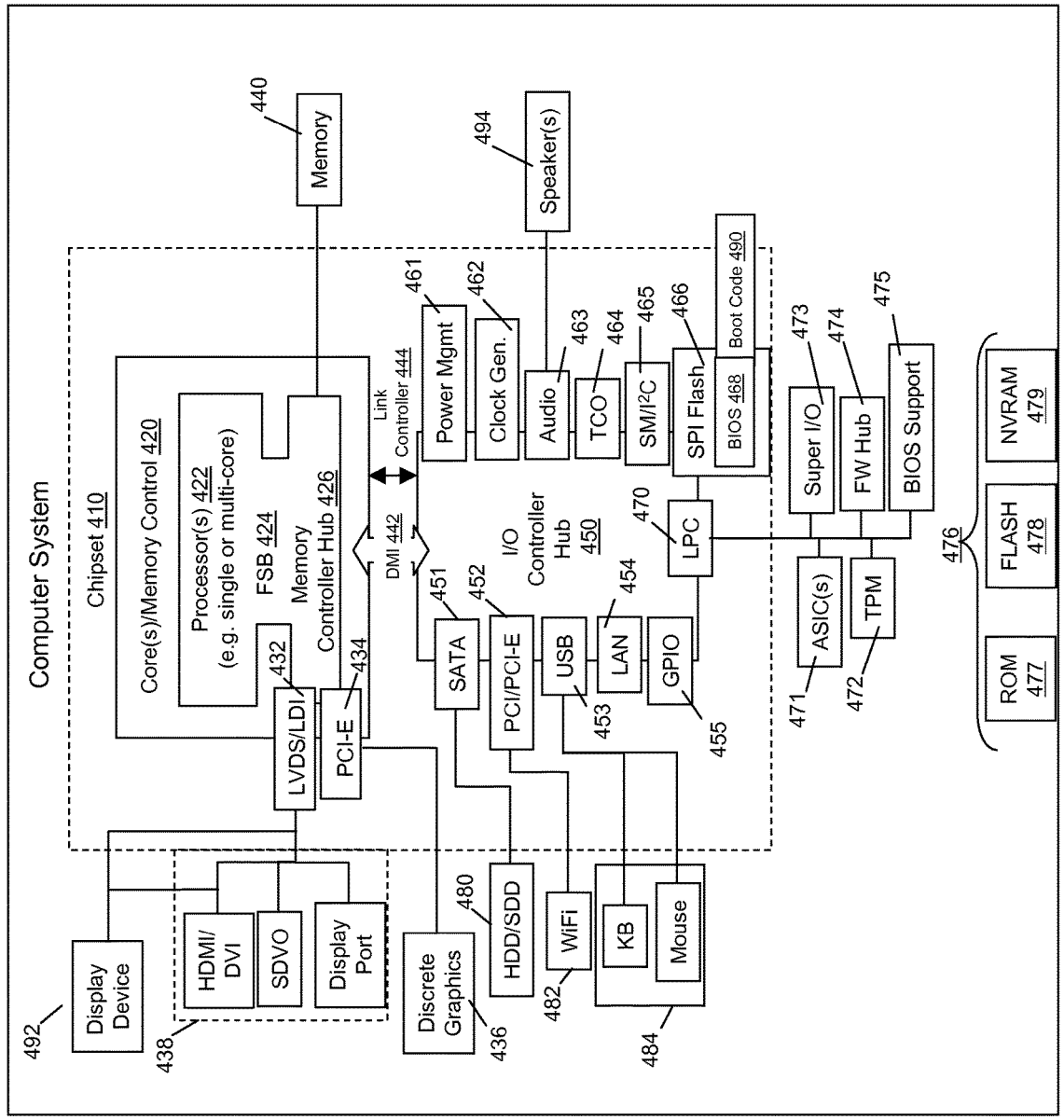
FIG. 4 illustrates an example computing device.

While various other circuits or circuitry may be utilized, FIG. 4 depicts a block diagram of one example of a computer system and circuitry. The system may be a tablet computer system, such as one of the ThinkPad® series of personal computers sold by Lenovo (US) Inc. of Morrisville, N.C.; however, as apparent from the description herein, a client device or other machine may include other features or only some of the features of the system illustrated in FIG. 4. In addition, the computer system and circuitry may also be utilized in other devices, including, but not limited to, a smart phone, Personal Digital Assistant (PDA), or a computing system embedded in an automobile.

The computer system of FIG. 4 includes a so-called chipset 410 (a group of integrated circuits, or chips, that work together, chipsets) with an architecture that may vary depending on manufacturer (for example, INTEL®, AMD®, ARM® etc.). The architecture of the chipset 410 includes a core and memory control group 420 and an I/O controller hub 450 that exchanges information (for example, data, signals, commands, et cetera) via a direct management interface (DMI) 442 or a link controller 444. In FIG. 4, the DMI 442 is a chip-to-chip interface (sometimes referred to as being a link between a "northbridge" and a "southbridge"). The core and memory control group 420 include one or more processors 422 (for example, single or multi-core) and a memory controller hub 426 that exchange information via a front side bus (FSB) 424; noting that components of the group 420 may be integrated in a chip that supplants the conventional "northbridge" style architecture.

In FIG. 4, the memory controller hub 426 interfaces with memory 440 (for example, to provide support for a type of RAM that may be referred to as "system memory"). The memory controller hub 426 further includes a LVDS interface 432 for a display device 492 (for example, a CRT, a flat panel, a projector, et cetera). A block 438 includes some technologies that may be supported via the LVDS interface 432 (for example, serial digital video, HDMI/DVI, display port). The memory controller hub 426 also includes a PCI-express interface (PCI-E) 434 that may support discrete graphics 436.

In FIG. 4, the I/O hub controller 150 includes a SATA interface 451 (for example, for HDDs, SDDs, et cetera), a PCI-E interface 452 (for example, for wireless connections 182), a USB interface 453 (for example, for input devices 484 such as a digitizer, keyboard, mice, cameras, phones, storage, et cetera.), a network interface 454 (for example, LAN), a GPIO interface 455, a LPC interface 470 (for ASICs 471, a TPM 472, a super I/O 473, a firmware hub 474, BIOS support 475 as well as various types of memory 476 such as ROM 477, Flash 478, and NVRAM 479), a power management interface 461, a clock generator interface 462, an audio interface 463 (for example, for speakers 494), a TCO interface 464, a system management bus interface 465, and SPI Flash 466, which can include BIOS 468 and boot code 490. The I/O hub controller 450 may include gigabit Ethernet support.

The system, upon power on, may be configured to execute boot code 490 for the BIOS 468, as stored within the SPI Flash 466, and thereafter processes data under the control of one or more operating systems and application software (for example, stored in system memory 440). An operating system may be stored in any of a variety of locations and accessed, for example, according to instructions of the BIOS 468. As described herein, a device may include fewer or more features than shown in the system of FIG. 4.

Embodiments provide for voice command devices that receive sound but do not transfer the voice data beyond the system unless certain voice-filtering criteria have been met. As described earlier, voice command devices include devices capable of being controlled through voice commands, including, but not limited to, cell phones, PDA's, computers, and automobile computer systems.

According to embodiments, voice command devices may be used in combination with other devices, which may or may not be voice command capable. As a non-limiting example, a cell phone may be coupled with an automobile computer system or laptop computer. As such, embodiments provide that the voice command system may be comprised of multiple devices, at least one of which handles voice commands. According to embodiments, one device may act as the local device while the other device may act as a secondary device. As a non-limiting example involving a cell phone coupled with an automobile computer system, the automobile computer system may act as the local device, handling voice data, while the phone acts as a secondary device. Furthering this non-limiting example, the automobile computer system may be capable of voice command 'hands-free' operation of certain features, and the cell phone may be incorporated into the system and operated through voice commands that are handled by the local automobile computer system. As such, embodiments provide that the handling of voice data at a local device may involve communicating the voice data for handling at a secondary device.

It should be understood that many of the functional characteristics of the embodiments described in this specification may be implemented as modules. Modules may include hardware circuits such as one or more processors with memory, programmable logic, and/or discrete components. The hardware circuits may perform hardwired logic functions, execute computer readable programs stored on non-signal storage devices, and/or execute programmed functions. The computer readable programs may in combination with other elements perform the functions of the embodiments.

It will be readily understood by those having ordinary skill in the art that embodiments may take the form of an entirely hardware embodiment or an embodiment containing both hardware and software elements. An embodiment that is implemented in software may include, but is not limited to, firmware, resident software, microcode, etc.

The computer readable programs may be stored any non-signal medium. Examples of a non-signal medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Accordingly, elements may be implemented on at least one electronic device running suitable software programs. These may also be implemented on at least one Integrated Circuit or part of at least one Integrated Circuit. Thus, it is to be understood that the embodiments may be implemented in a combination of both hardware and software. Again, computer/machine-readable programs may in combination with an electronic device perform the functions of the embodiments.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth example embodiments and, although specific terms are used, the description thus given uses terminology in a generic and descriptive sense only and not for purposes of limitation.

What is claimed is:

1. A system comprising:
   one or more processors;
   a system memory operatively coupled to the one or more processors storing instructions executable by the processor to:
   receive voice data obtained by a sound receiver;
   determine whether the voice data corresponds with one or more local voice criteria, wherein the one or more local voice criteria comprises a sound characteristic of the voice data other than a predetermined command;
   filter at least one word included in the voice data, based on the sound characteristic, such that it is not transmitted externally, wherein the at least one word corresponds to the one or more local voice criteria;
   automatically process the filtered at least one word locally to perform a corresponding function associated with the filtered at least one word; and
   provide, on a display screen, an indication of whether the voice data is being handled locally or transmitted externally, wherein the indication comprises displaying at least one icon on the display screen, wherein the at least one icon is associated with a first color and shape when the voice data is being handled locally and a second, different, color and shape when the voice data is being transmitted externally.

2. The system according to claim 1, wherein responsive to the voice data not corresponding to the one or more local voice criteria the voice data is transmitted externally.

3. The system according to claim 1, wherein the one or more local . voice criteria comprise a predetermined set of words.

4. The system according to claim 1, wherein the one or more local voice criteria comprise a pitch of the voice data.

5. The system according to claim 1, wherein the one or more local voice criteria comprise one or more non-conversational pauses in the voice data.

6. The system according to claim 1, further comprising a voice data buffer that buffers received voice data prior to analysis.

7. The system according to claim 1, further comprising one or more system voice commands that invoke system functions.

8. The system according to claim 7, further comprising instructions executable by the processor to handle the voice data that is not transmitted locally, wherein handling the voice data locally comprises processing the voice data as the one or more system voice commands.

9. The system according to claim 1, further comprising:
   a mute control that provides a mute operation mode;
   wherein responsive to the mute operation mode being enabled:
     the voice data is handled locally; and
     the voice data is not transmitted externally.

10. The system according to claim 1, further comprising:
    a display screen that displays feedback about the voice data;
    wherein feedback is selected from the group consisting of:
      an indication of whether the sound receiver is receiving voice data, an indication of whether the voice data is being handled locally or transmitted externally, and an indication of whether one or more voice commands have been activated.

11. A method comprising:
    receiving voice data at a sound receiver;
    determining, using a processor, whether the voice data corresponds with one or more local voice criteria, wherein the one or more local voice criteria comprises a sound characteristic of the voice data other than a predetermined command;
    filtering at least one word included in the voice data based on the sound characteristic such that it is not transmitted externally, wherein the at least one word corresponds to the one or more local voice criteria;
    automatically process the filtered at least one word locally to perform a corresponding function associated with the filtered at least one word; and
    providing, on a display screen, an indication of whether the voice data is being handled locally or transmitted externally, wherein the indication comprises displaying at least one icon on the display screen, wherein the at least one icon is associated with a first color and shape when the voice data is being handled locally and a second, different, color and shape when the voice data is being transmitted externally.

12. The method according to claim 11, wherein responsive to the voice data not corresponding to the one or more local voice criteria the voice data is transmitted externally.

13. The method according to claim 11, wherein the one or more local voice criteria comprise a predetermined set of words.

14. The method according to claim 11, wherein the one or more local voice criteria comprise a pitch of the voice data.

15. The method according to claim 11, wherein the one or more local voice criteria comprise one or more non-conversational pauses in the voice data.

16. The method according to claim 11, further comprising a voice data buffer that buffers received voice data prior to analysis.

17. The method according to claim 11, further comprising one or more system voice commands that invoke system functions.

18. The method according to claim 17, further comprising handling locally the voice data that is not transmitted externally, wherein handling the voice data locally comprises processing the voice data as the one or more system voice commands.

19. The method according to claim 11, further comprising:
- a mute control that provides a mute operation mode;
- wherein responsive to the mute operation mode being enabled:
  - the voice data is handled locally; and
  - the voice data is not transmitted externally.

20. A computer program product comprising:
- a computer readable storage device having computer readable program code embodied therewith, the computer readable program code being executable by a processor and comprising:
  - computer readable program code that receives voice data at a sound receiver;
  - computer readable program code that determines whether the voice data corresponds with one or more local voice criteria, wherein the one or more local voice criteria comprises a sound characteristic of the voice data other than a predetermined command;
  - computer readable program code that filters at least one word included in the voice data based on the sound characteristic such that it is not transmitted externally, wherein the at least one word corresponds to the one or more local voice criteria;
  - computer readable program code automatically that processes the filtered at least one word locally to perform a corresponding function associated with the filtered at least one word; and
  - computer readable program code that provides an indication of whether the voice data is being handled locally or transmitted externally, wherein the indication comprises displaying at least one icon on a display screen, wherein the at least one icon is associated with a first color and shape when the voice data is being handled locally and a second, different, color and shape when the voice data is being transmitted externally.

\* \* \* \* \*